United States Patent
Rueckheim et al.

(10) Patent No.: US 10,335,007 B2
(45) Date of Patent: Jul. 2, 2019

(54) BUCKET

(71) Applicant: Carl Freudenberg KG, Weinheim (DE)

(72) Inventors: Markus Rueckheim, Griesheim (DE); Christian Mast, Mannheim (DE); Mike Kosub, Bruchsal (DE); Tomaso Cascione, Milan (IT)

(73) Assignee: CARL FREUDENBERG KG, Weinheim (DE)

( * ) Notice: Subject to any disclaimer, the term of this patent is extended or adjusted under 35 U.S.C. 154(b) by 0 days.

(21) Appl. No.: 15/773,561

(22) PCT Filed: Nov. 2, 2016

(86) PCT No.: PCT/EP2016/076426
§ 371 (c)(1),
(2) Date: May 4, 2018

(87) PCT Pub. No.: WO2017/076904
PCT Pub. Date: May 11, 2017

(65) Prior Publication Data
US 2018/0317737 A1    Nov. 8, 2018

(30) Foreign Application Priority Data
Nov. 4, 2015   (DE) .................. 10 2015 014 122

(51) Int. Cl.
*A47J 47/18*     (2006.01)
*A47L 13/58*    (2006.01)

(52) U.S. Cl.
CPC .............. *A47L 13/58* (2013.01); *A47J 47/18* (2013.01)

(58) Field of Classification Search
CPC ................................ A47L 13/58; A47J 47/18
See application file for complete search history.

(56) References Cited

U.S. PATENT DOCUMENTS

| | | | | | |
|---|---|---|---|---|---|
| 1,517,164 | A | * | 11/1924 | Lear | A47J 47/18 15/264 |
| 5,941,410 | A | * | 8/1999 | Mangano | A47L 13/58 15/264 |

(Continued)

FOREIGN PATENT DOCUMENTS

| CH | 98751 A | 4/1923 |
|---|---|---|
| EP | 2774526 A2 | 9/2014 |

(Continued)

OTHER PUBLICATIONS

Victorian Square Copper Tea Kettle English VR Crown Mark, Copperton Lane Antiques and Collectibles, retrieved from internet on Mar. 22, 2019.

(Continued)

*Primary Examiner* — Randall E Chin
(74) *Attorney, Agent, or Firm* — Leydig, Voit & Mayer, Ltd.

(57) ABSTRACT

A bucket having a longitudinal direction and a transverse direction includes: a first extension in the longitudinal direction; a second extension in the transverse direction, the first extension being greater than the second extension; two longitudinal sides; a front transverse side; a rear transverse side; and at least one substantially bow-shaped handle. The at least one handle extends in the longitudinal direction and is pivotable in the transverse direction. A spout of the bucket includes a self-contained through-hole and is arranged in the front transverse side.

16 Claims, 11 Drawing Sheets

(56) References Cited

U.S. PATENT DOCUMENTS

2010/0223749 A1*  9/2010  Chiang .................. A47L 13/58
                                                          15/260
2010/0287724 A1    11/2010  Hsu
2013/0092698 A1*  4/2013  Orlandi .................. A47L 13/58
                                                          220/660

FOREIGN PATENT DOCUMENTS

GB         742050 A      12/1955
WO    2013151784 A1      10/2013

OTHER PUBLICATIONS

Antique Victorian Brass Belgium Watering Can, retrieved from Internet on Mar. 22, 2019.
Bucket with Holes, retrieved from internet on Mar. 22, 2019, published on Mar. 26, 2014.
Australian Examination Report dated Mar. 22, 2019, pages.

* cited by examiner

SECTION A-A

BUCKET

CROSS-REFERENCE TO PRIOR APPLICATIONS

This application is a U.S. National Phase application under 35 U.S.C. § 371 of International Application No. PCT/EP2016/076426, filed on Nov. 2, 2016, and claims benefit to German Patent Application No. DE 10 2015 014 122.8, filed on Nov. 4, 2015. The International Application was published in German on May 11, 2017 as WO 2017/076904 under PCT Article 21(2).

FIELD

The invention relates to a bucket having a longitudinal direction and a transverse direction, and having a first extension in the longitudinal direction and a second extension in the transverse direction, the first extension being greater than the second extension, comprising two longitudinal sides and a front transverse side and a rear transverse side and at least one substantially bow-shaped handle.

BACKGROUND

Such a bucket is generally known and is used as a household cleaning bucket, for example.

The longitudinal sides and the transverse sides transition into one another and delimit the interior of the bucket in the circumferential direction.

In the known bucket, the handle extends in the transverse direction and can pivot in the longitudinal direction. The handle is hinged to the two longitudinal sides of the bucket that are opposite one another in the transverse direction.

The upper rim of the bucket forms a spout, for example having a beak-shaped drip projection, it being possible for the contents of the bucket to be poured out over this upper rim when required.

However, it should be noted here that such a known bucket is often less than satisfactory to handle, in particular when the bucket has a large capacity and is filled to its maximum, and is therefore also very heavy. When carrying the bucket, the user has to rotate the hand being used to carry the bucket by 90° with respect to the natural hand position, in order to be able to securely grip the handle that extends in the transverse direction.

However, the natural hand position is when the palms of the hands face one another and the body of the user, with the thumbs of each hand thus pointing substantially forward.

In practice, there are two possible ways of carrying the known bucket. Either the back of the hand has to be rotated to the front and the palm has to be rotated to the back in order to be able to grip the bucket, or vice versa, such that the palm faces forward and the back of the hand faces backward. Both are ergonomically disadvantageous and can impair the user's health by causing tension in the shoulder and/or arm and/or hand, for example, particularly when the bucket is used regularly.

Carrying the bucket in front of the body also leads to tension, in particular in the back, and is extremely uncomfortable for the user.

If the contents of the bucket are poured out over the upper rim of the bucket, too powerful and/or too wide a stream is often created, which is difficult to handle, especially in private households.

In private households, buckets are usually emptied into small, conventional household sinks or toilet bowls. A too powerful and/or too wide stream is difficult to control and direct. When the bucket is emptied, some of the contents may be spilled, making the area around the sink or toilet bowl undesirably dirty.

SUMMARY

In an embodiment, the present invention provides a bucket having a longitudinal direction and a transverse direction, the bucket comprising: a first extension in the longitudinal direction; a second extension in the transverse direction, the first extension being greater than the second extension; two longitudinal sides; a front transverse side; a rear transverse side; and at least one substantially bow-shaped handle, wherein the at least one handle extends in the longitudinal direction and is pivotable in the transverse direction, and wherein a spout of the bucket comprises a self-contained through-hole and is arranged in the front transverse side.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

In an embodiment of the present invention, the at least one handle extends in the longitudinal direction and is pivotable in the transverse direction, and a spout of the bucket is formed as a self-contained through-hole and is arranged in the front transverse side.

In this case, it is advantageous that overall the bucket has effective ergonomics as a result of the arrangement of the handle that extends in the longitudinal direction. The user can then also maintain their natural hand position, with their palms facing inward toward one another, when carrying the bucket. Full and therefore heavy buckets can thus also be carried as safely and effectively as possible. The risk of tension in the user's back, shoulder, arm and hand is thereby minimized.

It is also advantageous that the handle that extends in the longitudinal direction stops the bucket from rocking in the longitudinal direction when the bucket is carried. In addition, the contents of the bucket move back and forth only slightly, if at all, when being transported and thus do not spill out under normal conditions. Swinging of the bucket in the longitudinal direction beneath the handle, for which the user has to arduously compensate in buckets from the prior art that comprise handles extending in the transverse direction, is ruled out by the arrangement of the handle in the longitudinal direction, according to the invention.

It is also advantageous that the contents of the bucket can be poured out through the spout according to the invention in a clean and controlled manner. If the bucket is tipped about the transverse axis of the bucket that extends in the transverse direction in order to empty out the contents, the contents of the bucket first move toward the front transverse side, accumulate on this front transverse side until reaching the spout in the form of the through-hole, and are then poured out through the through-hole. This results in a stream that has a clearly defined width and is therefore easy to handle, and so the bucket can also be used effectively in private households in which conventional household sinks or toilet bowls are also used, for example, for emptying the bucket.

Since the bucket, and therefore also the contents thereof, virtually no longer rocks at all when it is carried as a result of the arrangement, according to the invention, of the handle in the longitudinal direction, there is virtually no risk of the contents of the bucket undesirably spilling out through the through-hole arranged beneath the rim of the bucket when the bucket is used as intended.

The arrangement of the handle in the longitudinal direction in conjunction with the spout in the form of the self-contained through-hole means that the bucket according to the invention has excellent use properties overall.

According to an advantageous embodiment, the ratio of the first extension to the second extension can be ≥1.5. Such buckets can be oval or rectangular, for example. The relatively smaller dimensions in the transverse direction also allow for buckets having a comparatively large volume to be carried close to the user's body and therefore in an ergonomically advantageous manner.

The through-hole can comprise a drip projection in the form of a drip shield, which extends along the bottom of the through-hole. In this case, it is advantageous that, when emptying the contents out of the bucket, none of it is spilled; in particular that, owing to the drip shield, even when emptying the bucket and afterward, the area around the bucket is not made dirty by dripping contents, for example dirty cleaning fluid.

According to a first embodiment, the drip projection can be integrally formed with the border of the through-hole. In this case, it is advantageous that such a bucket has a simple structure consisting of few parts, and can therefore be produced in a manner which is advantageous in terms of manufacture and economy. A drip projection that is integrally formed with the border of the through-hole has, for manufacturing reasons, a comparatively weak contour, in particular due to the demoldability of the bucket out of its production mold, if said bucket is made of a polymer material.

According to another embodiment, the drip projection can be formed as a separately produced component part and can be arranged in the through-hole in a liquid-tight manner. In this case, it is advantageous that the shape of the drip projection can be effectively adapted to the respective requirements of the intended use. Depending on the particular intended use, the drip projection can therefore be designed to have a stronger or less strong contour. A bucket having a separately produced drip projection therefore has particularly effective use properties when it is being emptied.

The liquid-tight connection between the drip projection and the through-hole is provided to prevent any lack of tightness in the transition region between the through-hole and the drip projection and to thus prevent undesirable leaking in this region.

Owing to a frictional and/or interlocking connection, the drip projection can be arranged in the through-hole such that it can be nondestructively detached. On account of such an arrangement, buckets and separately produced drip projections can be combined in the form of a modular system. For example, it is possible to combine differently designed buckets with the same drip projection or differently designed drip projections with the same bucket.

The drip projection can comprise a marking that extends in the bucket and indicates a maximum permissible fill level of the bucket. In this case, the maximum permissible fill level of the bucket is such that, if used as intended, the contents do not overflow and make the surrounding area dirty, even when the bucket is filled to its maximum.

The bucket itself does not need a fill level indicator when it is integrally formed with the drip projection.

If only one handle is used, said handle can be hinged to the corresponding transverse sides by means of a front hinge and a rear hinge, the spout being arranged beneath the front hinge. The through-hole is therefore arranged beneath the front hinge so that the stream is not deflected by the front hinge or the handle when the bucket is emptied. The stream pours directly out of the bucket through the through-hole. The front hinge of the handle, which is arranged above the through-hole, or the handle itself is not affected by the stream passing coming out of the through-hole when the bucket is emptied.

When viewed in the transverse direction, the above-described hinges are preferably each arranged centrally on the corresponding transverse sides. If the bucket comprises just one handle, which is hinged in the manner described above, the structure of the bucket consists of few parts, is simple and cost-effective to produce and also has only a low dead weight. The bucket is then preferably symmetrical in the transverse direction when viewed from above. As a result, the bucket virtually automatically swings horizontally in the transverse direction below the handle.

When viewed in the longitudinal direction, the handle can comprise a substantially anti-slip gripping region on the side facing away from the spout. The anti-slip gripping region makes it easier to empty the bucket. One of the user's hands grips the handle near the rear hinge when emptying the bucket so that the bucket therefore tips, virtually by itself, such that its spout tips downward and the contents are therefore emptied out through the through-hole.

The anti-slip first gripping region can be achieved by anti-slip surface profiling of the handle in this region and/or a rubber coating, for example.

According to another embodiment, the bucket can comprise two handles that extend substantially in parallel with one another, each of which handles is hinged to one of the longitudinal sides by means of a front hinge and a rear hinge, it being possible for the handles, when viewed in the transverse direction, to be positioned against one another above the bucket in order to carry it. In this case, it is advantageous in particular that buckets that have a large volume and are filled to their maximums can be carried by two people at the same time. In this case, each person holds one of the two handles in their hand and close to their body in an ergonomically advantageous manner.

In addition or as an alternative to the first gripping region, the handles can also each comprise, centrally in the longitudinal direction, a second gripping region that is formed as a carrying zone. The second gripping region can be particularly ergonomically advantageous, for example, such that this gripping region fits snugly into the user's hand particularly effectively and comfortably. The second gripping region is sufficiently wide and/or cushioned to prevent it uncomfortably cutting into the user's hand when the bucket is completely full. In a similar manner to the first gripping region, for example, the second gripping region can comprise a rubber coating.

Buckets are generally known in various sizes and shapes. If a bucket is used as a cleaning bucket, it may comprise a wringing-out device for a piece of cleaning equipment. The wringing-out device can be connected to the bucket, preferably to the rim of the bucket, so that it cannot be detached or can be nondestructively detached therefrom. A nondestructive detachable connection can be formed by a latching connection. Engaging lugs of the wringing-out device can engage with undercuts in the rim of the bucket, for example.

According to an advantageous embodiment, a clamp-shaped receptacle can be provided on the handle for the handle of a piece of cleaning equipment so that the piece of cleaning equipment, for example a mop, can be held in the bucket in an upright position and fixed by the clamp-shaped receptacle. The clamp-shaped receptacle can form an integral component of the handle made of the same material.

The bucket can comprise a bucket base comprising a grip that is arranged at the rear in the longitudinal direction. When emptying the bucket, the user holds the bucket in one hand by the first gripping region of the handle and uses the other hand to hold the grip in the rear region of the bucket base. This makes it easier to empty the bucket, and the contents of the bucket can be poured out in a particularly well-controlled and targeted manner.

FIGS. 1 to 5 show a first embodiment of a bucket according to the invention. The bucket is substantially oval, having a first extension 3 in the longitudinal direction 1 and a second extension 4 in the transverse direction 2, the first extension 3 being greater than the second extension 4.

The bucket comprises the bucket base 23 and the two longitudinal sides 5, 6, which each transition into the front transverse side 7 and the rear transverse side 8. The handle 9 spans the opening 26 of the bucket in the longitudinal direction 1 and is shaped like a bow. The handle 9 is pivotable in the transverse direction 2 and is hinged to the front transverse side 7 by means of the front hinge 10 and to the rear transverse side 8 by means of the rear hinge 11.

The bucket and the handle 9 consist of a polymer material.

A spout 12 formed as a self-contained through-hole 13 is provided in the front transverse side 7, the through-hole 13 being arranged beneath the front hinge 10, i.e. between the opening 26 of the bucket and the bucket base 23, when the bucket is viewed in the vertical direction 27.

In the embodiment shown here, the ratio of the first extension 3 to the second extension 4 is just under 2. The length of the bucket is therefore approximately twice as long as its width.

The longitudinal sides 5, 6 and the transverse sides 7, 8 integrally transition into one another and are made of the same material. The hinges 10, 11 are arranged at the very top of the bucket, in the region of its rim 28.

Figure 1:
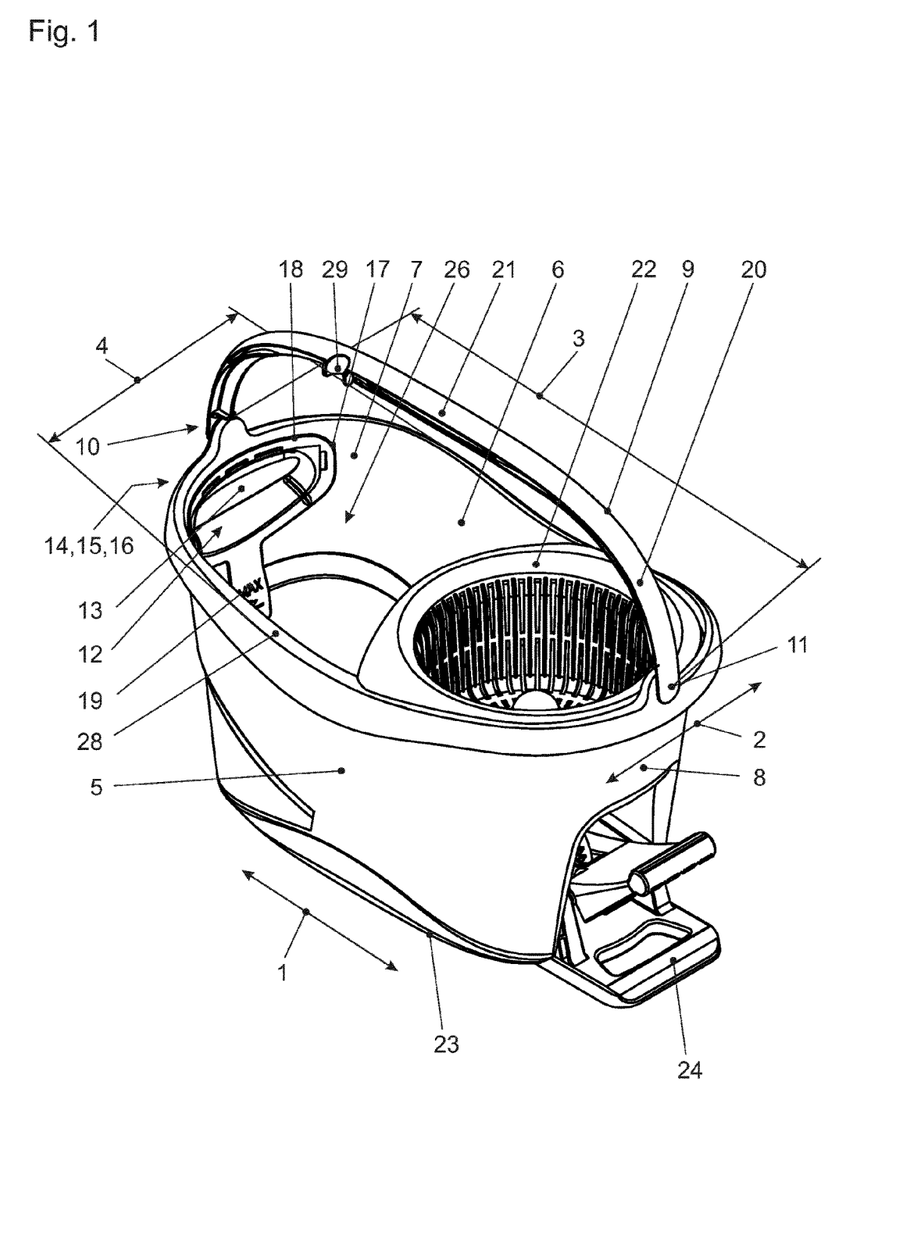
FIG. 1 is a schematic perspective view of a first embodiment of a bucket according to the invention comprising just one handle.

FIG. 1 is a perspective view of the bucket. When viewed in the transverse direction 2, the hinges 10, 11 are each arranged centrally on the corresponding transverse sides 7, 8.

In the embodiment shown here, the through-hole 13 is formed as a drip shield 14 and comprises a drip projection 15 that extends along the bottom 16 of the through-hole.

Figure 2:
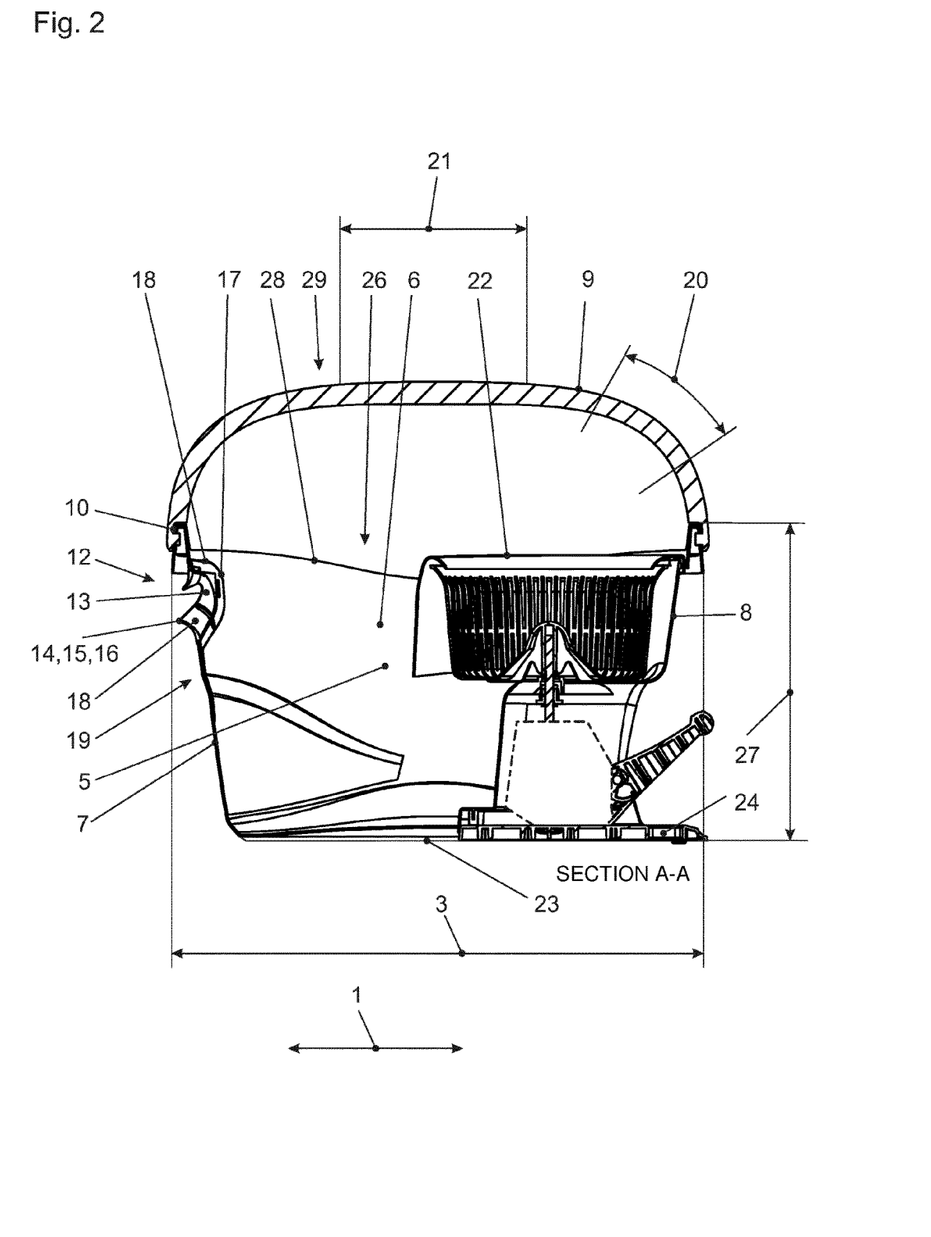
FIG. 2 is a schematic longitudinal section through the bucket from FIG. 1.
Figure 3:
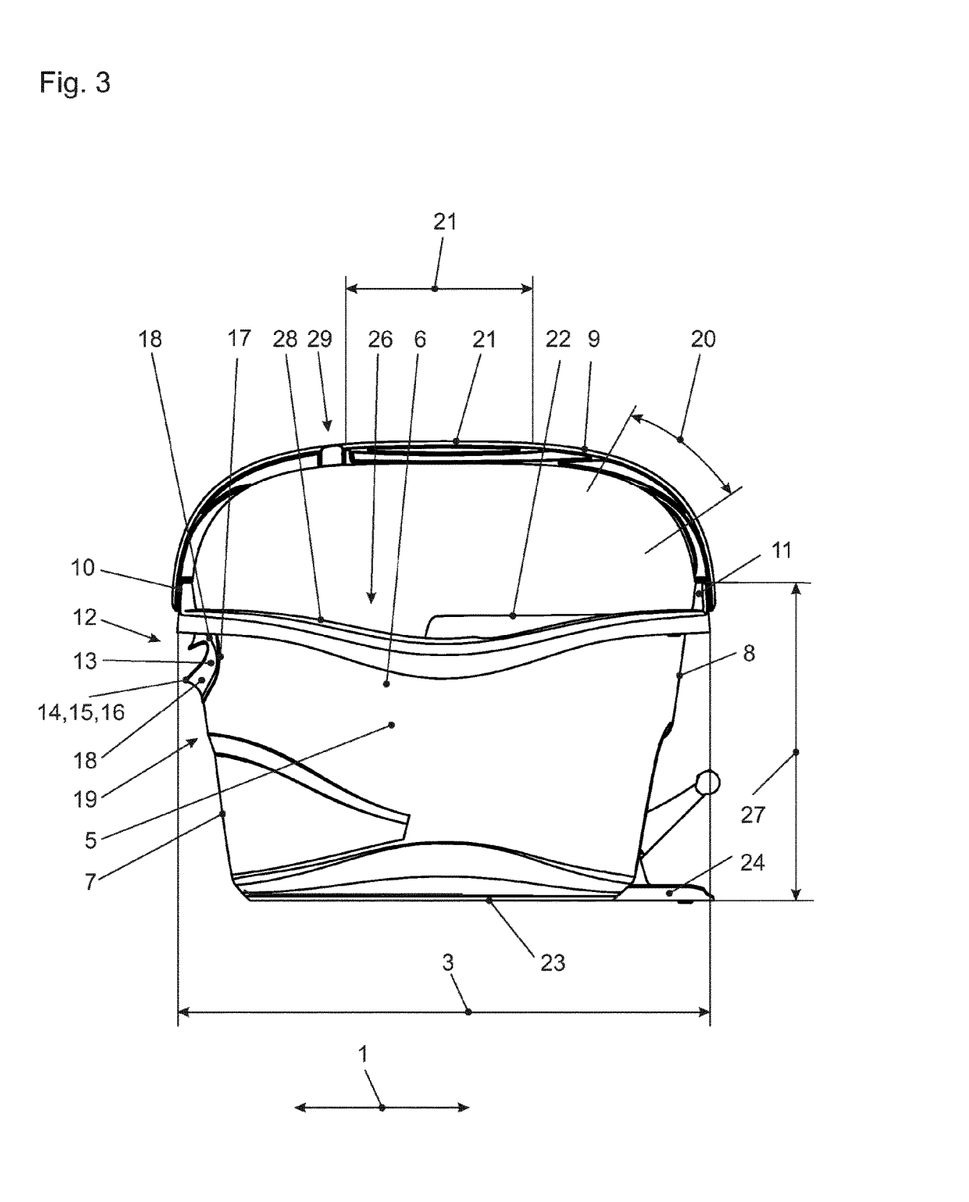
FIG. 3 is a schematic side view of the bucket from FIG. 2.
Figure 5:
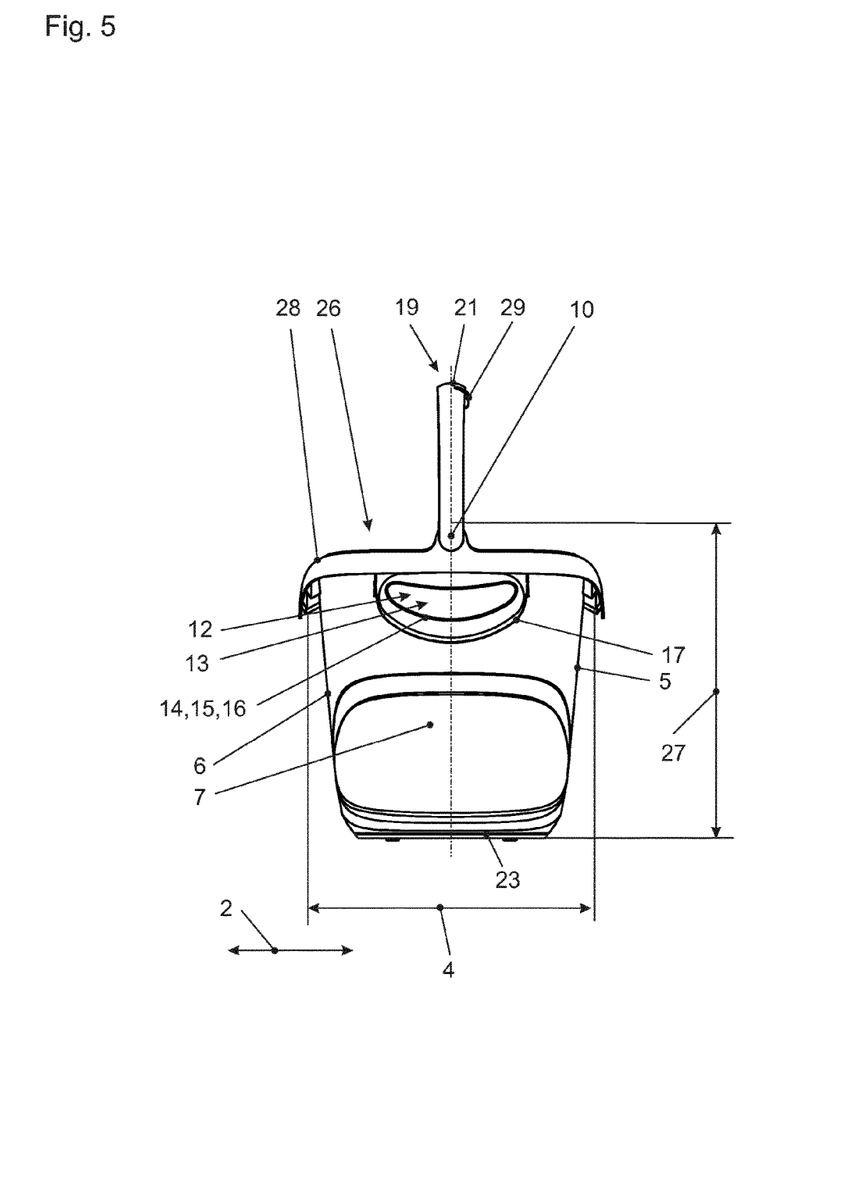
FIG. 5 is a schematic front view of the bucket according to FIG. 1.

The drip projection 15 can be seen more clearly in FIGS. 2, 3 and 5.

In the embodiment shown here, the drip projection 15 is formed as a separately produced component part 18 and is inserted into the through-hole 13 in a liquid-tight manner.

The marking 19 and the drip projection 15 integrally transition into one another and are made of the same material, said marking indicating the maximum permissible fill level of the bucket. The marking 19 is arranged inside the bucket, as is the wringing-out device 22 for a piece of cleaning equipment. The piece of cleaning equipment can be formed by a mop, for example. The wringing-out device 22 can be formed by a spinning basket, as is shown in this case, which is mechanically or electrically driven, as is known in the art.

The handle 9 comprises different gripping regions 20, 21. When viewed in the longitudinal direction 1, the first gripping region 20 is arranged on the side facing away from the spout 12, and makes it easier to pour out the contents of the bucket. In the embodiment shown here, the first gripping region 20 has an anti-slip profile and/or is coated with rubber.

In contrast, the second gripping region 21 is arranged centrally on the handle 9 in the longitudinal direction 1 and forms a carrying zone. The carrying zone is designed such that the bucket can be carried as ergonomically and comfortably as possible even when it is completely full.

As can be clearly seen in this figure, the handle 9 comprises a clamp-shaped receptacle 29, in which the handle of a mop can be interlockingly received. This makes it possible for the mop to be held in the bucket in an upright position.

In the region of the bucket base 23, at the rear in the longitudinal direction 1, a grip 24 is arranged, which makes it easier to empty the bucket. The grip 24 can be a component of the bucket base 23 or, as in this case, can be a component of a drive of the wringing-out device 22.

In FIG. 2, the bucket from FIG. 1 is partially shown in longitudinal section. The handle 9 extends in the longitudinal direction 1 over the entire second extension 4 and is pivotally fastened to the transverse sides 7, 8 of the bucket, in the transverse direction 2, in the region of the hinges 10, 11.

The wringing-out device 22, in the form of a spinning basket in this case, and the drive thereof are shown schematically. The wringing-out device 22 can, for example, be interlockingly snapped into the rim 28 of the bucket that delimits the opening 26.

The drip projection 15 that is formed as a separately produced component part 18 is clearly contoured, and ensures that the contents of the bucket are fully emptied out when emptying the bucket, and, after emptying, ensures that no drips remain on the spout 12 that could later undesirably drip into the surrounding area.

FIG. 3 is a side view of the bucket from FIG. 2. Only the drip projection 15 is shown in section. The two gripping regions 20, 21 can be seen clearly in this drawing, as can the clamp-shaped receptacle 29 for a piece of cleaning equipment.

Figure 4:
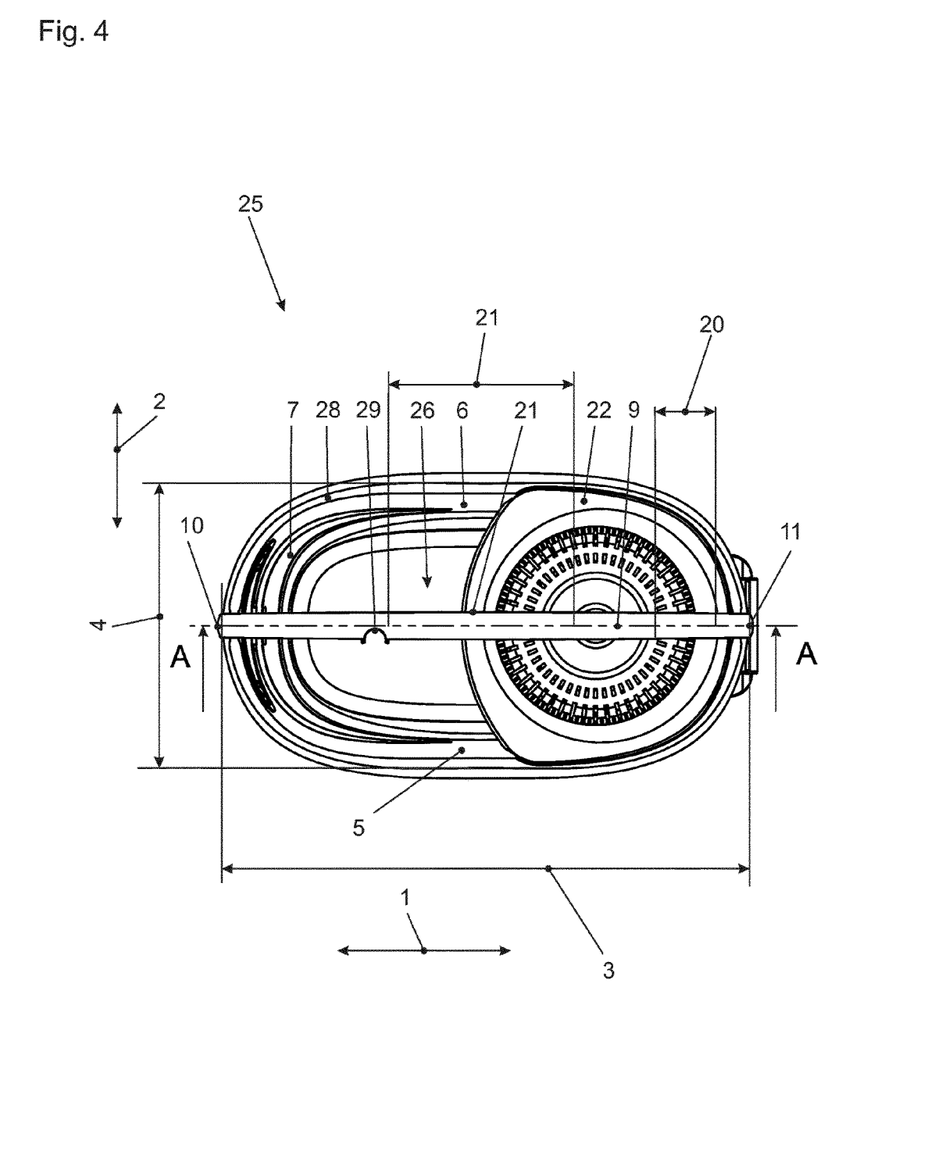
FIG. 4 is a schematic plan view of the bucket according to FIG. 1.

FIG. 4 is a plan view of the bucket from FIGS. 1 to 3. The wringing-out device 22 covers part of the opening 26. As a result of the curvature of the front transverse side 7 and as a result of the through-hole 13 that is self-contained in the circumferential direction and forms the spout 12, the contents of the bucket can be emptied in a narrow stream in a manner that is easily controllable, thereby minimizing the risk of the contents spilling.

The spout 12 is not obstructed by any of the components of the bucket, in particular not by the front hinge 10 of the handle 9 on the front transverse side 7 since, when the bucket is viewed in the vertical direction 27, the spout 12 is located beneath the front hinge 10.

FIG. 5 shows the bucket from the front. The self-contained through-hole 13 comprises the drip projection 15, which is formed as a drip shield 14 and extends along the bottom 16 of the through-hole 13.

When viewed in the circumferential direction, the through-hole 13 is substantially crescent-shaped. Such a shape has proven particularly successful, since the contents of the bucket can be emptied through such a through-hole 13 in a manner that is particularly easy to control, is uniform and spatter-free.

FIGS. 6 to 10 show a second embodiment of a bucket according to the invention. The second embodiment differs from the first embodiment according to FIGS. 1 to 5 only by the number of handles 9, 9.1, 9.2 and hinges 10, 10.1, 10.2; 11, 11.1, 11.2 thereof.

The two handles 9.1, 9.2 extend in parallel with one another, each of the handles comprising a front hinge 10.1, 10.2 and a rear hinge 11.1, 11.2. The handles 9.1, 9.2 are each hinged to a longitudinal side 5, 6 of the bucket and are also pivotable in the transverse direction 2, like the handle 9 from the first embodiment.

When the bucket is set down, the handles 9.1, 9.2 are folded downward. In contrast, when the bucket is carried, the handles 9.1, 9.2 are folded upward such that the second gripping regions 21.1, 21.2 touch above the bucket so as to rest against one another, as shown here.

The two handles 9.1, 9.2 make it possible for the bucket to be carried by two people at the same time. Each person holds one of the handles 9.1, 9.2 in this case. This also allows buckets that have a large volume and are filled to their maximums to be carried relatively comfortably.

Figure 6:
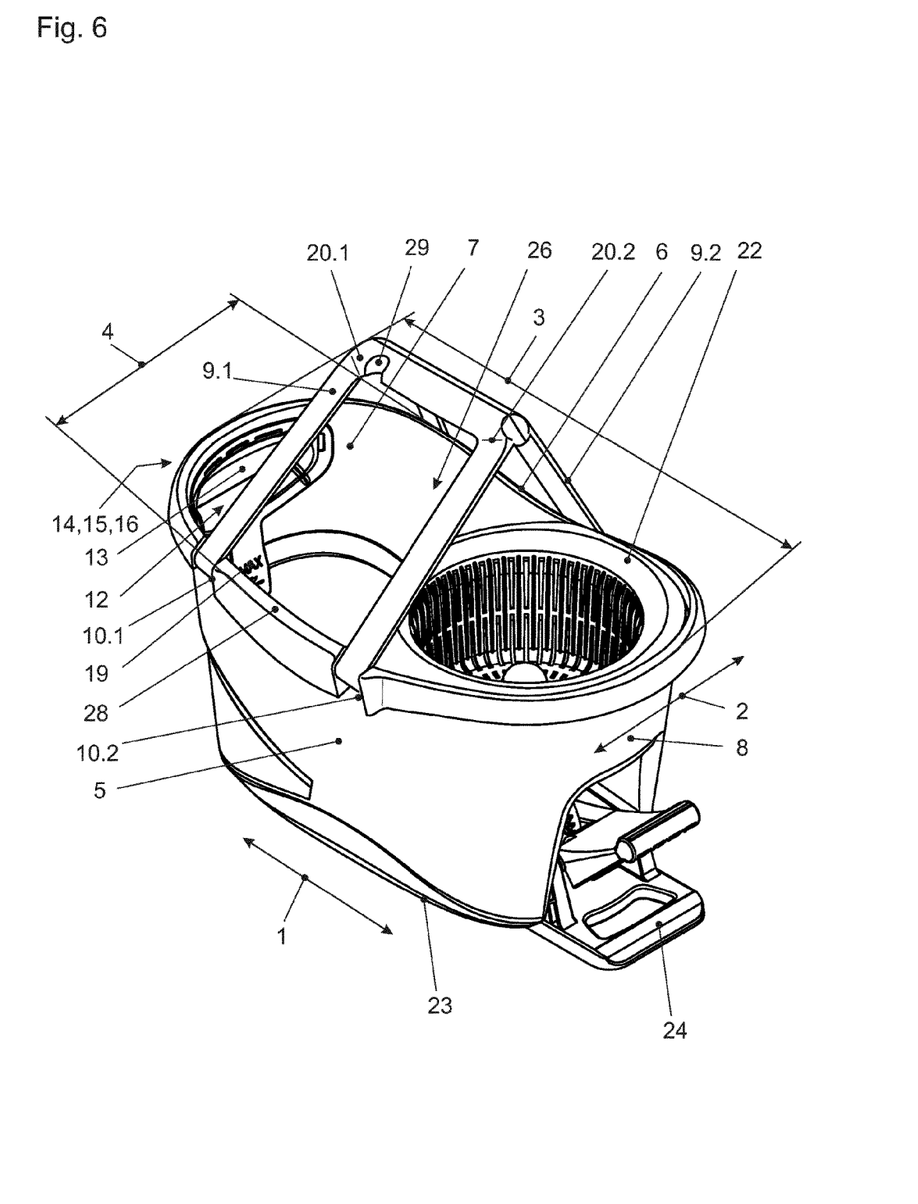
FIG. 6 is a schematic perspective view of a second embodiment of a bucket according to the invention comprising two handles.

FIG. 6 is a perspective view of a second embodiment of the bucket according to the invention.

Figure 7:
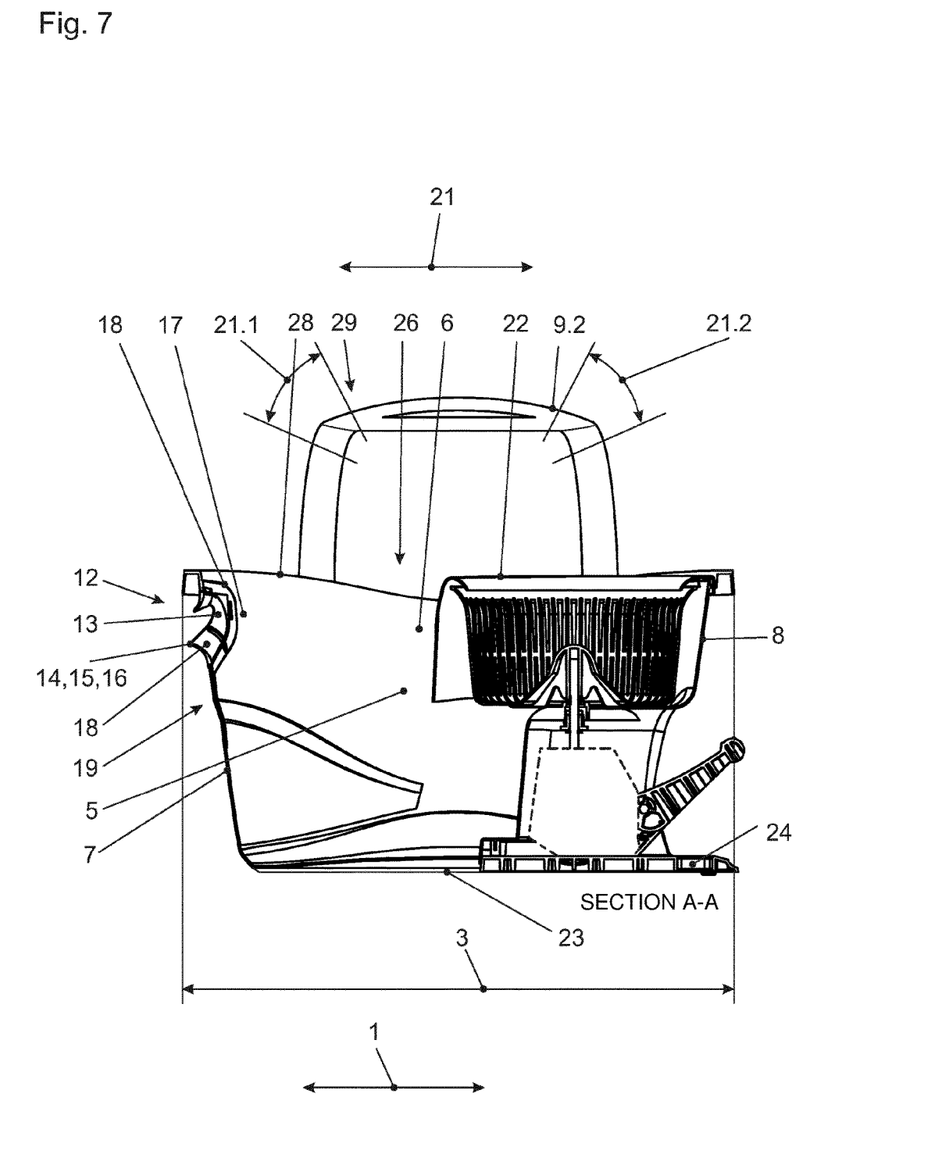
FIG. 7 is a schematic longitudinal section through the bucket from FIG. 6.

FIG. 7 is a longitudinal section through the bucket from FIG. 6.

Figure 8:
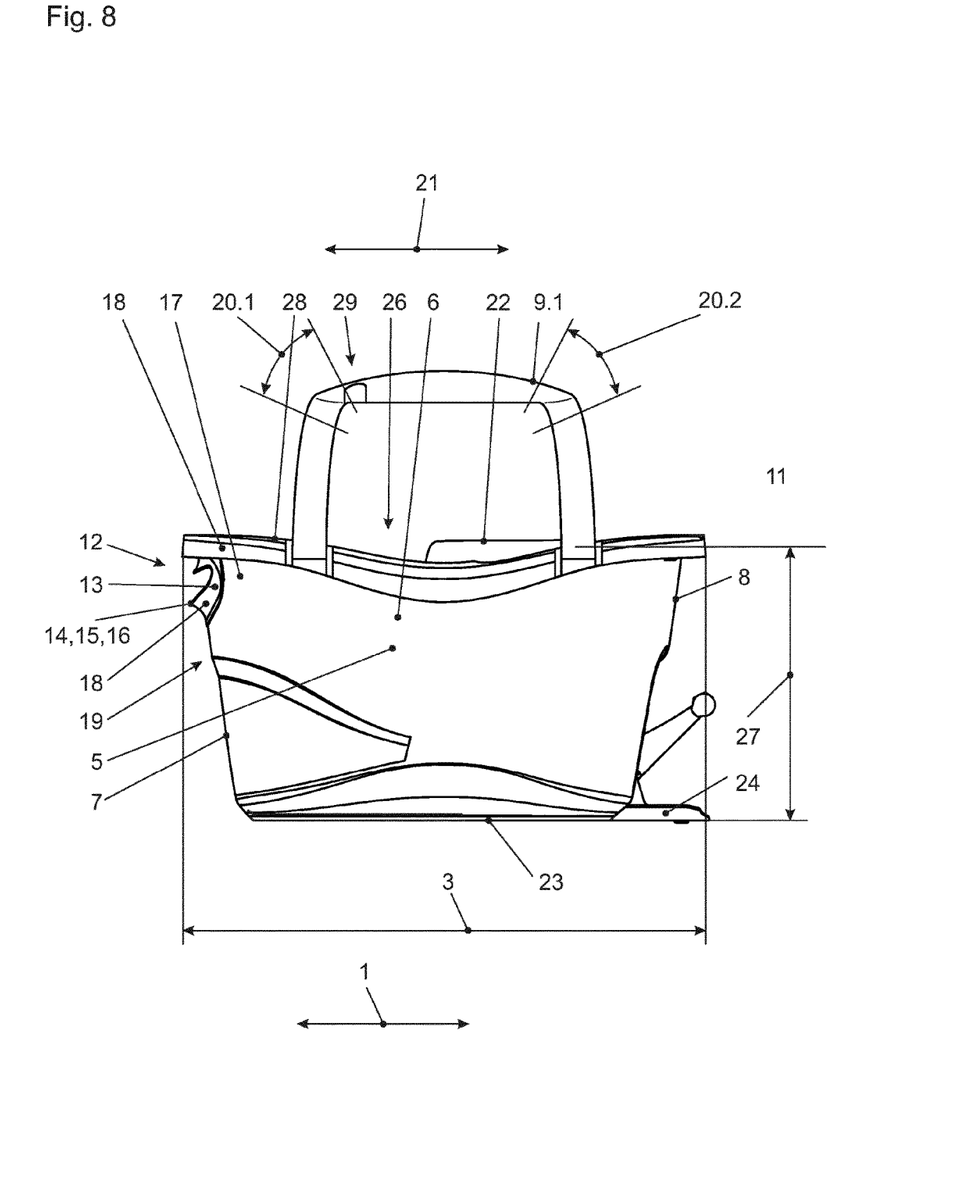
FIG. 8 is a schematic side view of the bucket from FIG. 7.

FIG. 8 is a side view of the bucket from FIG. 7.

Figure 9:
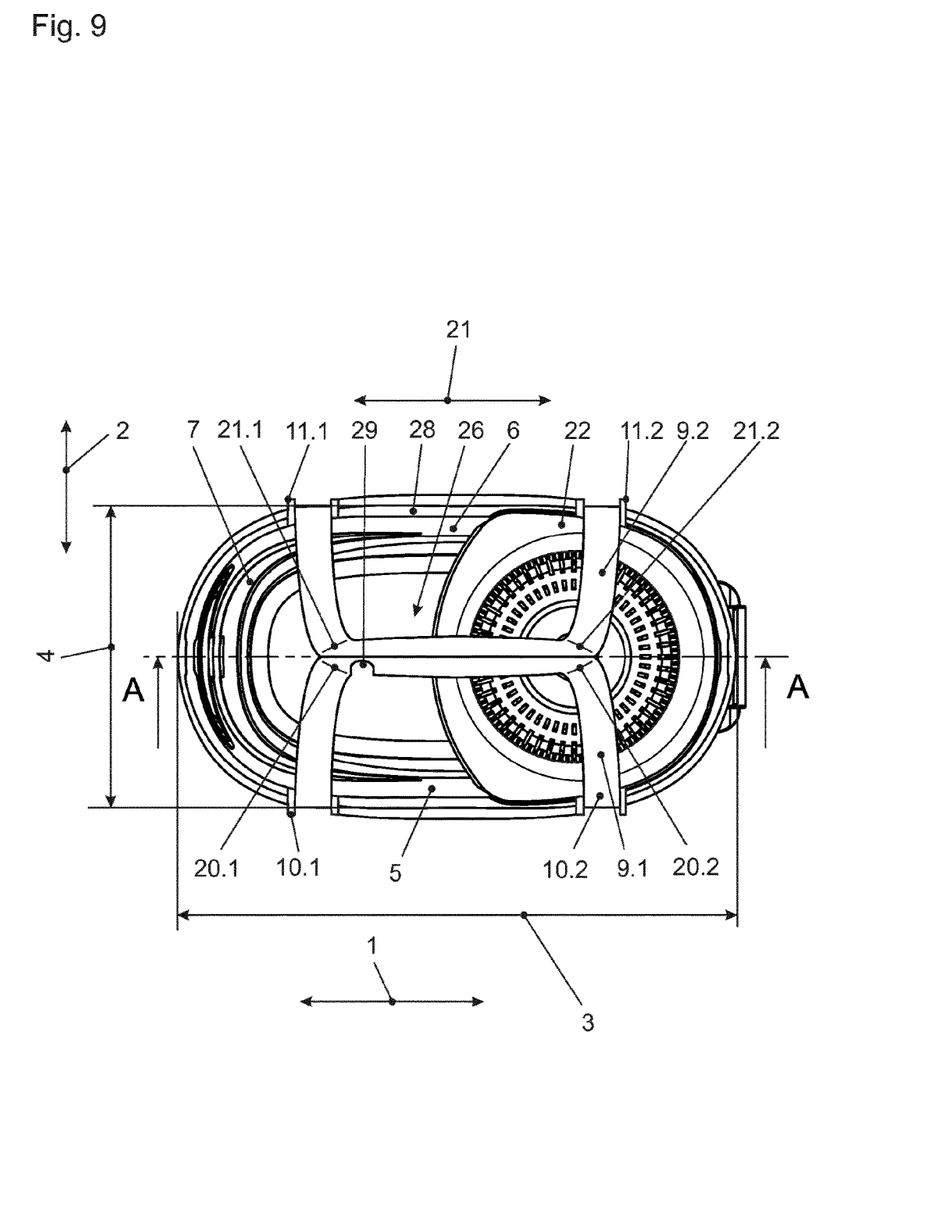
FIG. 9 is a schematic plan view of the bucket according to FIG. 6.

In contrast, FIG. 9 is a plan view of the bucket according to FIG. 6.

Figure 10:
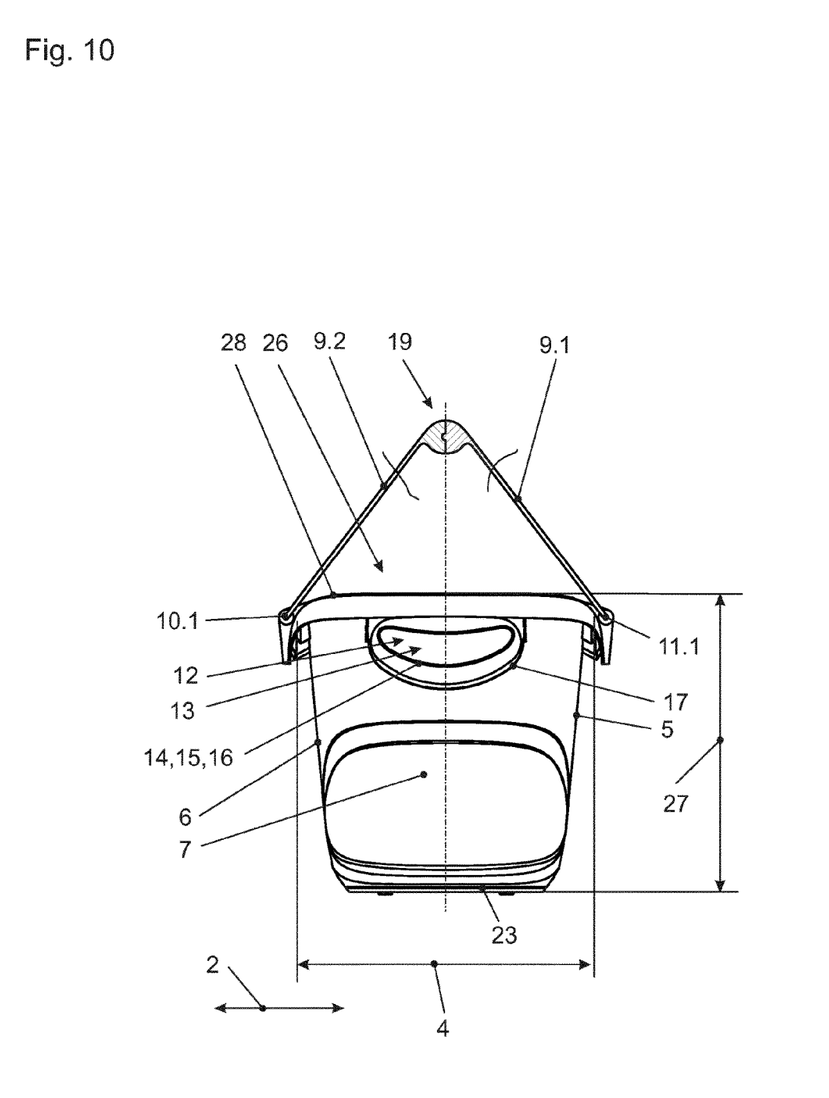
FIG. 10 is a schematic front view of the bucket according to FIG. 6.

FIG. 10 is a front view of the bucket from FIG. 6, comprising the through-hole 13, which comprises a drip projection 15 that is formed as a drip shield 14 and extends along the bottom 16 of the through-hole 13.

Figure 11:
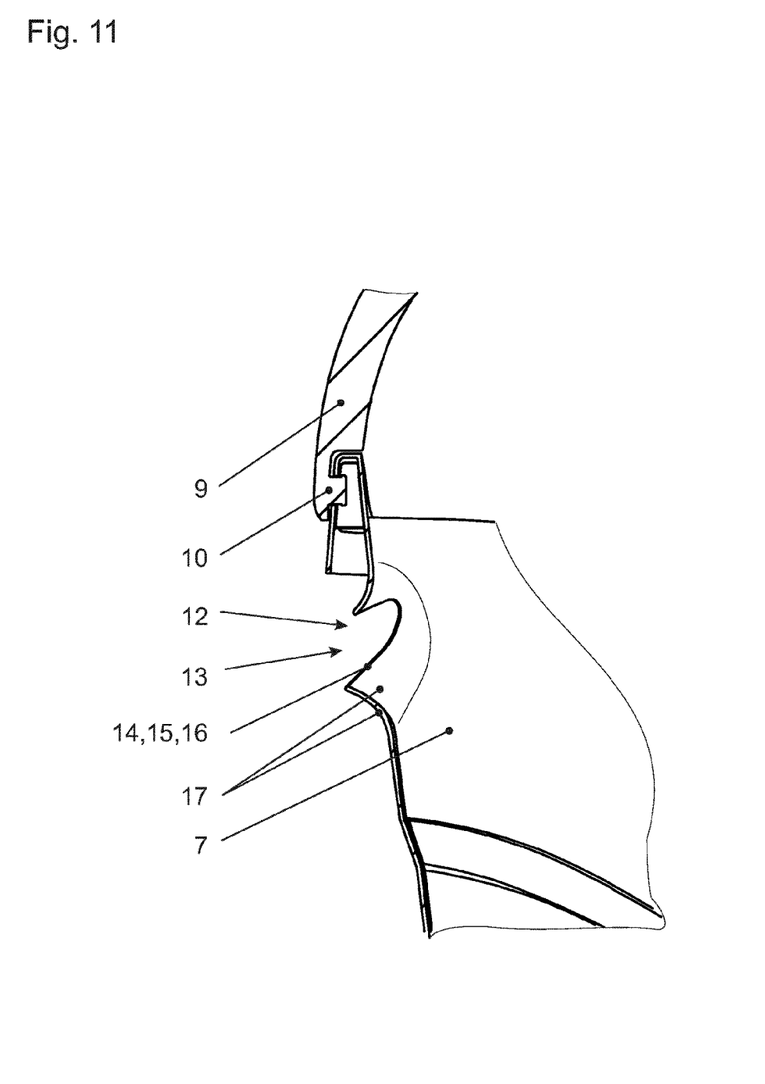
FIG. 11 is a schematic view of an additional drip projection, which has a different design from the drip projections from FIGS. 1 to 10.

FIG. 11 shows another drip projection 15, which has a different design from the drip projections 15 from FIGS. 1 to 10.

The drip projection 15 is in the shape of a beak. The drip projection 15 forms an integral component of the border 17 at the bottom 16 of the through-hole 13, and the drip projection and the front transverse side 7 of the bucket integrally transition into one another and are made of the same material.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A bucket having a longitudinal direction and a transverse direction, the bucket comprising:
   a first extension in the longitudinal direction;
   a second extension in the transverse direction, the first extension being greater than the second extension;
   two longitudinal sides;
   a front transverse side;
   a rear transverse side; and
   at least one substantially bow-shaped handle,
   wherein the at least one handle extends in the longitudinal direction and is pivotable in the transverse direction, and
   wherein a spout of the bucket comprises a self-contained through-hole and is arranged in the front transverse side.

2. The bucket according to claim 1, wherein a ratio of the first extension to the second extension is ≥1.5.

3. The bucket according to claim 1, wherein the through-hole comprises a drip projection comprising a drip shield, which extends along a bottom of the through-hole.

4. The bucket according to claim 3, wherein the drip projection is integrally formed with a border of the through-hole.

5. The bucket according to claim 4, wherein the drip projection comprises a separately produced component part and is arranged in the through-hole in a liquid-tight manner.

6. The bucket according to claim 5, wherein the drip projection is arranged in the through-hole so as to be nondestructively detached as a result of a frictional and/or interlocking connection.

7. The bucket according to claim 5, wherein the drip projection comprises a marking that extends in the bucket and indicates a maximum permissible fill level of the bucket.

8. The bucket according to claim 1, wherein the at least one handle is hinged to the corresponding transverse sides by a front hinge and a rear hinge, and wherein the spout is arranged beneath the front hinge.

9. The bucket according to claim 8, wherein, when viewed in the transverse direction, the hinges are each arranged centrally on the corresponding transverse sides.

10. The bucket according to claim 8, wherein, when viewed in the longitudinal direction, the at least one handle comprises a substantially anti-slip first gripping region on a side facing away from the spout.

11. The bucket according to claim 1, wherein the at least one handle comprises two handles that extend substantially in parallel with one another, each of the two handles being hinged to one of the longitudinal sides by a front hinge and a rear hinge, and wherein, when viewed in the transverse direction, the two handles are configured to be positioned against one another above the bucket in order to carry it.

12. The bucket according to claim 11, wherein the two handles each comprise, centrally in the longitudinal direction, a second gripping region that comprises a carrying zone.

13. The bucket according to claim 1, further comprising a wringing-out device for a piece of cleaning equipment.

14. The bucket according to claim 1, wherein the at least one handle comprises a clamp-shaped receptacle for a handle of a piece of cleaning equipment.

15. The bucket according to claim 1, further comprising a bucket base comprising a grip that is arranged at the rear in the longitudinal direction.

16. The bucket according to claim 1, wherein, when viewed in the vertical direction, the bucket is symmetrical in the transverse direction.

* * * * *